Patented Nov. 21, 1933

1,935,985

UNITED STATES PATENT OFFICE 1,935,985

ARTIFICIAL STONE PRODUCT AND METHOD OF MAKING SAME

Hynek Oberherr, Cleveland, Ohio, assignor to The American Artificial Marble Company No Drawing. Application May 2, 1931
Serial No. 534,703

14 Claims. (Cl. 18—48.8)

This invention, relating as indicated to an artificial stone product or products and a method of making the same, has specific reference to a method of manufacturing an artificial stone product closely resembling marble.

I am aware that numerous attempts have been made in the past in an endeavor to produce an artificial stone product closely resembling marble, such products usually being termed artificial marble. In some of such developments, the true marble effect was sought to be produced by binding together chips or like particles of natural marble by means of hydraulic cement and then polishing the resultant product in an endeavor to produce a surface simulating a natural marble finish. These efforts have not met with success for a number of reasons which are now so well known to those familiar with the art that a further enumeration thereof is unnecessary.

Numerous other attempts have been made to produce an artificial stone product like natural marble by the employment of Portland cement in combination with suitable filler materials and pigments to lend the desired color and solutions or solid materials for imparting the desired satin or glossy finish to the resultant product. These efforts have been only partially successful in view of their failure to produce a product which has the same durability and finish as natural marble. Another imperfection in artificial marble formed in this manner has been that such product is usually porous or semi-porous so as to be readily stained and consequently, during use, soon becomes unsightly to the point where it has been found impractical for commercial installations.

It is among the objects of my invention to provide a method of making an artificial stone product resembling natural marble which shall have none of the above named undesirable characteristics but shall be a true representation of natural marble and which has all of the natural product's desirable characteristics.

Other objects of my invention will appear as the description proceeds.

To the accomplishment of the foregoing and related ends, said invention, then consists of the means hereinafter fully described and particularly pointed out in the claims;

The following description sets forth in detail one method and one product exemplifying my invention, such disclosed procedure and product constituting, however, but one of various applications of the principles of my invention.

The aggregates which have been found most satisfactory for the production of an artificial stone product having the above named desirable characteristics and most closely resembling natural marble are Portland cement, chalk, suitable pigments added for the purpose of coloring, a binder solution and material which may be in the form of a solution applied to the surface of the molded product or incorporated with the material forming a superficial layer on such surface to impart thereto the desired finish, both from the standpoint of durability as well as appearance.

It will be noted that the pigment added for the purpose of producing the desired color in the product may either be in solid pulverized form or in solution depending upon the particular materials employed. Also, in addition to the employment of chalk with the Portland cement, it may be found desirable to employ quantities of sulphur or marble flour depending upon the desired finished product.

As a specific example of the relative quantities of ingredients employed, one mixture used may comprise in parts by weight, chalk, 25, cement, 10, and pigment, ½. These relative quantities, however, can be varied considerably without materially changing the resulting product or departing from the principles comprising my invention.

The above named ingredients in the proportions specified or in any other suitable proportions found desirable, are ground to a fineness so that the separate constituents cannot be readily recognized in the mass. The mass is then reduced to a plastic state by the addition of a solution which may be water, a fluoride such as magnesium fluoride, a solution of sodium silicate or a solution of oxalic acid. After the materials have been so reduced to a plastic mass, it will be understood that by mixing therein suitable coloring materials so as to produce veins or local areas of contrasting colors, the mass is molded and permitted to set to form a slab or like article of desired shape.

After the material has sufficiently hardend, the same will be polished or provided with a finished surface in the manner hereinafter more fully explained.

The hereinbefore outlined group of ingredients combined in the manner specified may be employed for the production of an artificial stone article having certain characteristics which resemble and closely approach the physical characteristics of natural marble. Another group of ingredients which may be employed for the purpose of producing the body of the slab or like article to be formed may include Portland cement or any other suitable binding agent and any one of a group of relatively course aggregates such as sand, marble chips and the like and, if preferred, a suitable pigment for the purpose of lending color to the composite mass. This last named group of aggregates, including the Portland cement and the color, if employed, will be suitably mixed so as to produce a uniform mixture and then reduced to a plastic state by the addition of any one or more of the solutions specified for the purpose of rendering plastic the first named group of materials set forth for forming the body of the slab or like article.

This last named group of materials will also be molded or pressed into the desired form and permitted to harden sufficiently so that the finishing coat hereinafter more fully explained may be applied.

With the body of the slab or like article formed in either of the manners hereinbefore described, the next step in the manufacture of the artificial stone product comprising my invention is the application of a suitable finish or finish coat to the article thus formed so that the same may truly resemble the physical appearance of natural marble and also possess its desirable physical characteristics such as non-porosity and the like.

A finish closely resembling natural marble may be produced on the hereinbefore described previously prepared slabs or like articles by polishing the same with a suitable quantity of oxalic acid placed on the surface of the articles during the time the polishing operation is carried on. The oxalic acid will, during the process of reducing imperfections in the surface of the article, produce a resultant finish having the physical appearance which most closely resembles natural marble. Instead of applying the oxalic acid either in solution or crystalline form to the surface of the slabs or articles being polished during the polishing operation, a somewhat more desirable finish may be attained in the following manner:

A quantity of chalk or similar carbonate may be mixed with a solution or oxalic acid to produce a plastic mass which is spread onto the slab or like article formed in the manner previously described in order to form a thin layer or surface coating of such material on the body portion. After this layer has set sufficiently to be worked, the same may be polished by a coating either of oxalic acid and fluoride and/or a solution of sodium silicate.

A particular function of the oxalic acid employed in the manner specified in addition to the provision of the smooth finish is the formation of calcium oxalate crystals which produce in the finished surface of the product a multi-faceted appearance which has light reflecting properties identical with those of natural marble so that the finished product most closely resembles the natural stone. These oxalate crystals produce the desired finish even though the actual smooth finish is provided by either the fluoride or the waterglass solutions, or both in combination.

It will be noted that the combination of elements above specified to produce the desired results may be varied from those recited so long as the same net result is produced without departing from the principles comprising my invention.

An artificial stone product made in the manner specified has desirable properties in addition to those enumerated, which, it is believed, will be so apparent to those skilled in the art that a further enumeration thereof is unnecessary.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. An artificial stone of chalk and Portland cement and having a surface-finish of oxalate crystals.

2. An artificial stone having a body portion of Portland cement and chalk and a surface layer of calcium oxalate crystals.

3. An artificial stone having a body portion formed of chalk and Portland cement, and a polished surface formed of a layer of oxalic acid.

4. An artificial stone resembling marble, having a body portion formed of chalk and Portland cement, and a polished surface formed of oxalate crystals and a layer of oxalic acid.

5. An artificial stone resembling marble, having a body portion formed of chalk and Portland cement, and a polished surface formed of a layer of oxalate crystals and a fluoride.

6. An artificial stone resembling marble, having a body portion formed of chalk and Portland cement, and a polished surface formed of oxalate crystals and a layer of waterglass.

7. An artificial stone resembling marble, having a body portion formed of chalk and Portland cement, and a polished surface formed of a layer of oxalate crystals, fluoride and waterglass.

8. A process of making artificial stone resembling marble, which comprises preparing a plastic mixture of chalk and Portland cement, molding the plastic mass to desired form, and then polishing it with oxalic acid.

9. A process of making artificial stone resembling marble, which comprises preparing a plastic mixture of chalk and Portland cement, molding the plastic mass to desired form, and then polishing it with oxalic acid and fluoride.

10. A process of making artificial stone resembling marble, which comprises preparing a plastic mixture of chalk and Portland cement, molding the plastic mass to desired form, and then polishing it with oxalic acid and magnesium fluoride.

11. A process of making artificial stone resembling marble, which comprises preparing a plastic mixture of chalk and Portland cement, molding the plastic mass to desired form, and then polishing it with oxalic acid and waterglass.

12. A process of making artificial stone resembling marble, which comprises preparing a plastic mixture of chalk and Portland cement, molding the plastic mass to desired form, and then polishing it with oxalic acid, magnesium fluoride and waterglass.

13. The method of making artificial stone resembling marble, which comprises preparing a plastic mixture of chalk and Portland cement, molding the plastic mass to desired form, and coating the molded mass with a mixture of chalk and oxalic acid.

14. A method of making artificial stone resembling marble, which comprises applying a mixture of chalk and oxalic acid to an artificial stone body, and polishing the surface with oxalic acid.

HYNEK OBERHERR.